US006395316B1

(12) United States Patent
Leas et al.

(10) Patent No.: US 6,395,316 B1
(45) Date of Patent: *May 28, 2002

(54) COATING FOR FROZEN CONFECTIONARY

(75) Inventors: Alain Leas, Dublin, OH (US); Junkuan Wang, Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/397,994

(22) Filed: Sep. 16, 1999

(30) Foreign Application Priority Data

Sep. 18, 1998 (EP) ............................. 980203136

(51) Int. Cl.⁷ .................................. A23G 3/00
(52) U.S. Cl. ................. 426/101; 426/602; 426/660
(58) Field of Search ................. 426/101, 100, 426/602, 302, 305, 660

(56) References Cited

U.S. PATENT DOCUMENTS

| 1,718,997 A | * | 7/1929 | Burt |
| 1,901,394 A | * | 3/1933 | Hassell |
| 2,217,700 A | * | 10/1940 | Musher |
| 2,524,291 A | * | 10/1950 | Hoffman |
| 2,570,031 A | * | 10/1951 | Gibson |
| 2,878,127 A | * | 3/1959 | Forkner |
| 3,223,532 A |  | 12/1965 | Pinkalla et al. ............... 99/123 |
| 3,845,224 A | * | 10/1974 | Moneymaker et al. |
| RE30,722 E | * | 8/1981 | Olds et al. |
| 4,353,927 A | * | 10/1982 | Lovercheck |
| 4,500,553 A | * | 2/1985 | Liggett et al. |
| 4,560,563 A | * | 12/1985 | Tresser |
| 5,273,763 A | * | 12/1993 | Merz et al. |
| 5,409,719 A |  | 4/1995 | Cain et al. ................... 426/103 |
| 5,556,659 A |  | 9/1996 | De Pedro et al. ........... 426/302 |
| 5,659,000 A | * | 8/1997 | Cain et al. |
| 5,773,073 A |  | 6/1998 | Matsuda et al. ............ 426/602 |
| 5,798,131 A | * | 8/1998 | Bertrand et al. |
| 5,958,476 A | * | 9/1999 | Cain et al. |
| 6,159,526 A | * | 12/2000 | Morikawa et al. |
| 6,174,555 B1 | * | 1/2001 | Leas et al. |

FOREIGN PATENT DOCUMENTS

| EP | 397 247 | * | 11/1990 |
| EP | 547 658 | * | 6/1993 |
| JP | 59-59149 | * | 4/1984 |
| JP | 59059149 | * | 4/1984 |
| JP | 59 059149 A |  | 4/1984 |
| WO | WO 95/24831 | * | 9/1995 |
| WO | WO 97 02754 |  | 1/1997 |

* cited by examiner

Primary Examiner—Nina Bhat
(74) Attorney, Agent, or Firm—Winston & Strawn

(57) ABSTRACT

A coating composition for frozen desserts is in the form of a water-in-oil emulsion which comprises about 65 to 80% by weight water phase and about 0.5 to 8% by weight of an emulsifier. The coating composition may be used to form a film, a layer, or an inclusion in a frozen dessert product.

13 Claims, No Drawings

COATING FOR FROZEN CONFECTIONARY

TECHNICAL FIELD

The present invention relates to a water-in-oil emulsion based coating and its applications as an internal and external substitute for conventional fat-based coatings in frozen desserts. It further relates to a method of coating a frozen confectionery product, for example, an ice confectionery.

BACKGROUND ART

In a conventional fat-coated frozen confectionary product, for example an ice lolly, bar, morsel, cone, cup or cake, the fat may account for some 45–60% by weight of the coating. In ice confectionary products with conventional fat-based coatings, the fat gives some brittleness to the coating, the coating does not properly adhere to the ice confectionary core, and there is a poor release of flavor in the mouth. In the art, water-containing natural food compositions, such as fruit juice, cannot be covered with conventional fat-based coatings.

In U.S. Pat. No. 5,556,659 there is claimed a process for coating a frozen confectionary product in which the coating composition has reduced calories in that it is in the form of a water-in-oil emulsion, wherein the emulsion comprises 40 to 55% by weight water, 2 to 4% by weight of an emulsifier system comprising decaglycerine decaoleate, and less than about 3% by weight water-soluble compounds. This coating was designed to reduce calories while keeping the crispness/brittleness.

In JP 59,059,149 there is disclosed a reduced cost and reduced calorie composition for enrobing an ice confectionary based on a water-in-oil emulsion, in which the emulsifier system is a combination of polyglycerine condensed ricinoleic acid ester as the major emulsifier, and one of a glycerine fatty acid ester, a sorbitan fatty acid ester, or lecithin as a sub-emulsifier. In the emulsion, additives like color, flavor, and seasoning were combined to inexpensively make ice creams with different colors and flavors. Nothing is mentioned, however, about the physical properties of coating made by the emulsion. The enrobing composition has a high fat content.

Thus, it would be desirable to provide a coating composition which, in addition to having a substantially reduced fat content, also has a soft texture, good adhesion to ice cream or other ice confectionery, good flavor release, good storage and heat-shock resistance properties, and which can be processed in a conventional coating operation. The present invention satisfies this need.

SUMMARY OF THE INVENTION

The present invention relates to a coating composition for coating frozen dessert products in the form of a water-in-oil emulsion. The coating composition includes about 20 to 35% by weight fat phase; about 80 to 65% by weight water phase, wherein the water phase comprises about 10 to 70% by weight carbohydrates; and about 0.5 to 8% by weight of an emulsifier. The emulsifier may be a sugar ester, polyglycerol polyricinoleate, a polysorbate, a monoglyceride, or a mixture thereof. Preferably the emulsifier has a global hydrophilic lipophilic balance of <5.

The coating composition may further include other ingredients such as sweeteners, flavorings, aroma agents, preservatives, colorants, or a mixture thereof. The other ingredients may be non-fat cocoa solids, coffee, caramel, and fruit.

The water phase of the coating composition may be a high water-containing food liquid or beverage. The high water-containing food liquid or beverage may be a fruit juice with pulp, a fruit juice without pulp, tea, coffee, honey, malt, caramel, maple syrup, or a mixture thereof.

The invention further relates to a method of preparing the coating composition. The coating composition is prepared by mixing water and the other ingredients at an acidic pH to prepare the aqueous phase; mixing a fat with an emulsifier at a temperature where the fat is liquid to prepare the fat phase; slowly introducing the aqueous phase into the fat phase while mixing to prepare a pre-emulsion; and further mixing the pre-emulsion under shear to form the emulsion, wherein the water phase represents about 80 to 65% by weight and the emulsifier represents about 0.5 to 8% by weight of the final composition. The method may also include pasteurizing the water phase in a high temperature short time mix plant having a high shear mix tank, heating/cooling exchanger, holding tubes and optionally a homogenizer.

The present invention also relates to a frozen confectionary product including a frozen dessert material and a coating composition in the form of a water-in-oil emulsion wherein the water-in-oil emulsion includes about 20 to 35% by weight fat phase; about 80 to 65% by weight water phase, wherein the water phase includes about 10 to 70% by weight carbohydrates; and about 0.5 to 8% by weight of an emulsifier. The coating composition may form a film, a layer, or an inclusion in the frozen dessert material.

The present invention also relates to a method of coating a piece of frozen dessert material by dipping the frozen dessert material in the water-in-oil coating composition, wherein the water-in-oil emulsion is at a temperature of about 28 to 40° C.

The present invention also relates to a method of molding pieces of frozen confectionary by inserting the water-in-oil emulsion coating composition into a mold, removing excess coating composition to form a shell, filling in the shell with ice cream, backing off with additional liquid coating, inserting a stick, and demolding to remove the frozen confectionary from the mold. A frozen confectionary product may also be prepared by co-extruding the water-in-oil coating composition with ice cream from a die to form a coating, center, or ripple of the coating composition in the ice cream.

DETAILED DESCRIPTION OF THE PREFERRED EMBODIMENTS

We have found that it is possible to produce a coating based on a water-in-oil emulsion which has texture and flavor properties that are superior to conventional fat-based coatings; significantly better keeping properties; better softness, e.g., less brittleness; and better adhesion to the frozen confectionary.

Accordingly, the present invention provides a water-in-oil emulsion for coating frozen dessert products, which comprises about 20 to 35% by weight of a fat phase; about 80 to 65% by weight of a water phase, wherein the water phase contains about 10 to 70% by weight carbohydrates; and the emulsion comprises about 0.5 to 8% by weight of an emulsifier system.

In the context of the invention the coating composition is not limited to surface coatings but also includes using the coating in applications where alternate layers of ice confectionary and coating are used to create layered products. The coating composition can also be used to form solid pieces which may be used, for instance, in place of chocolate inclusions.

The frozen dessert material may be any dairy or non-dairy product, for instance ice cream, iced milk, sherbet, sorbet, frozen custard, frozen yoghurt, or frozen mousse. It may be aerated or not aerated.

Advantageously, the emulsifier may comprise sugar esters, polyglycerol fatty acid esters, polyglycerol polyricinoleate (PGPR), polysorbates (polyoxyethylene sorbitan esters), monoglycerides, or combinations thereof, preferably with a global hydrophilic lipophilic balance (HLB) of <5.

With respect to the water phase, high water-containing food liquids and beverages, such as fruit juice; with or without pulp; coffee; tea; honey; malt; caramel; or maple syrup may be used.

Sugar and other water-soluble compounds (e.g., humectants) preferably are present at levels exceeding about 5% by weight of the total coating composition and help to provide sufficient softening of texture and emulsion stability.

Other ingredients may be present including sweeteners, flavorings, or colorants, the proportions of which are determined according to taste and/or appearance. Non-fat cocoa solids, which may come from cocoa liquor or cocoa powder, may be used as flavorings. Other flavors, for example, coffee, may also be added, depending on preference.

With respect to the fat phase, fats such as coconut fat or vegetable fat stearin or blends with a liquid oil may be used, to give the required texture to the coating composition.

The water phase may contain a preservative, for example a sorbate or ascorbic acid, and preferably has a pH of about 2.5 to 5 in order to ensure that it will not support the growth of spoilage microorganisms.

Preferably the resulting water phase is pasteurized, for example, in a high temperature short time (HTST) mix plant consisting of a high shear mix tank, plate heating/cooling exchanger, holding tubes and optionally a homogenizer. As an alternative the heat exchanger may comprise a shell and a tube heating/cooling unit without a homogenizer.

The coating composition may further contain crispy inclusions, for example, cereals like expanded or toasted rice, or dried fruit pieces. These inclusions must be coated in moisture barriers to delay the absorption of moisture from the coating, which would eventually result in their becoming soggy.

The invention further relates to a method of preparing the previously defined coating composition. The method comprises mixing water, ingredients of the aqueous phase, preservatives, aroma agents, and sweetening agents at an acidic pH to make the aqueous phase, and separately mixing a fat phase with the emulsifier at a temperature where the fat is liquid. The aqueous phase is then slowly introduced into the fat phase while mixing to prepare a pre-emulsion, and then further mixing the pre-emulsion under shear depending on the composition of the emulsion and the thickness of the coating required. The water phase represents about 65 to 80% by weight and the emulsifier system about 0.5 to 8% by weight of the final composition.

The coating composition is prepared by dissolving the emulsifier in the molten fat at a temperature of about 25 to 50° C. The aqueous phase is then separately warmed up to a temperature of about 30 to 45° C. and progressively added to the fat phase under fine flow and agitation as a pre-emulsification step, thus forming a water-in-oil emulsion.

To achieve a desired viscosity for dipping application, the resulting water-in-oil emulsion is further sheared. This can be done in a batch with a U-shape stirring rod agitator at a higher speed, or in a colloidal mill; or continuously with a rotor/stator dispersing device or by pumping the pre-emulsion through a static mixer with a high flow speed. An in-line rotor/stator dispersing device and/or static mixer is preferred for a better consistency of the coating.

The final coating can be stored at a positive temperature, e.g., 20–22° C., so that it is solidified. The coating can then be melted and mixed well for re-use.

A piece of frozen confectionary may be coated by the previously defined water-in-oil emulsion coating composition by dipping the piece into the coating wherein the coating composition is at a temperature of about 28 to 40° C.

The products obtained with this method have very good resistance to melting at about 20° C. compared to products dipped in water-based coatings. Water-based coatings containing a pure aqueous phase have a poor resistance to melting. In addition, water-based coatings need special equipment for subsequent cooling, sometimes to very low temperatures, to freeze the coating.

Resistance to melting was demonstrated with a drip test. The drip test was carried out with the following equipment: a stainless steel grid/sieve held on a support, a scale, and a computer connected to the scale to record weight at preset time intervals. The apparatus was placed in a room with controlled air temperature (20° C.) and a relative humidity of about 50 to 60%. The drip test was performed according to the following procedure: a coated ice cream bar was weighed and placed on a grid/sieve of standard US 8 mesh with squared holes of 2.36 mm (0.0937 inch). The time was set to zero and the weight was recorded at pre-set time intervals with the computer. After 1 h, the test was stopped. Weights and the weight loss expressed per 100 g of initial weight were recorded. The test was conducted with the product of the present invention (prepared according to Example 1) and with a commercial product (SOLERO, as disclosed in EP-A-0710074) for comparison purpose. The results are given in following Table 1.

TABLE 1

| Time (min.) | Weight loss (g) for the product of Example 1 | Weight loss (g) for the product of comparison |
| --- | --- | --- |
| 0 | 0 | 0 |
| 12 | 0 | 0 |
| 17 | 0 | 3 |
| 20 | 0 | 5 |
| 30 | 0 | 15 |
| 35 | 0 | 18 |
| 40 | 2 | 20 |
| 45 | 3 | 22 |
| 50 | 4 | 25 |
| 55 | 5 | 27 |
| 60 | 7 | 30 |

It is clear from the above results that the coating according to the present invention has a much better resistance to melting than known water-based coatings.

The coating composition may also be used to mold pieces of frozen confectionary. The molded pieces of frozen confectionary are prepared by inserting the liquid coating composition in a mold, removing excess liquid coating from the mold to form a shell, filling in the shell with ice cream, backing off with additional liquid coating, optionally inserting a stick, and demolding, e.g., by heating.

Ice cream pieces, portions, morsels, domes or cakes may also be coated using an enrober.

The invention also relates to the use of the coating composition to form a film, a layer or an inclusion in a frozen dessert.

In one embodiment, the coating composition is dropped onto a belt or band or into a mold followed by cooling to form solid pieces, e.g., drops of coating which can be used as inclusions in ice cream.

In another embodiment, the coating composition is sprayed to form a film or layer on the surface of an ice cream product, or films or layers inside an ice cream product to form a multilayered product.

In yet another embodiment, the liquid coating composition can be co-extruded with ice cream from a die to form a coating, a center, or ripple in the ice cream.

EXAMPLES

The invention is further defined by reference to the following examples describing in detail the methods and products of the present invention. The examples are representative, and should not be construed to limit the scope of the invention in any way. In the following examples percentages and parts are expressed by weight unless otherwise specified.

Example 1

An aqueous phase was prepared by mixing raspberry fruit concentrate (65° Brix), water, and sugar at ambient temperature and warmed up to 35–38° C.

A fat phase was separately prepared by mixing coconut oil and emulsifiers at 36–40° C. In the case of sugar ester as the emulsifier, the mixture was heated to 75° C. to completely dissolve the sugar ester into the oil and then the mixture was cooled to 36–40° C. Cooling led to crystallization of a small portion of the sugar ester in very fine particles, consequently, the fat phase became cloudy.

385 g of diluted raspberry fruit juice concentrate (35° C.) was progressively added (fine flow) to 165 g of the fat mix (38° C.), in a 600 ml of beaker (diameter 75 mm), under agitation (460 rpm) with a U-shape stirring rod, thus forming a water-in-oil emulsion. The agitation was continued at a temperature between 35° C. and 38° C. The ingredients of the composition are provided in Table 2.

The emulsion was then agitated at a higher rotation speed (1000 rpm) by the same agitator for 1–2 min. The resulting mass was then ready for dipping ice cream bars.

Ice cream bars were dipped into the above emulsion. Due to accumulation at the end (tip) of the ice cream bar it took approximately 100 seconds for the coating at the end of the ice cream bar to set. After drying the products were stored at −18° C. The coated ice cream bars were very shiny with an attractive fruit color, the coating was soft (when cut with a knife while frozen, there was no cracking), and the coating was well adhered to the ice cream. The dipping results are summarized in Table 3.

Example 2

700 g of diluted raspberry fruit juice concentrate (35° C.) was progressively added (fine flow) to 300 g of the fat mix (39° C.), in a 1000 ml of beaker, under agitation (460 rpm) with a U-shape stirring rod, thus forming a water-in-oil emulsion. The agitation was continued at a temperature between 35 and 38° C. The ingredients of the composition are indicated in Table 2.

The emulsion was then transferred to a separation funnel, which was positioned 50–60 cm above a rotor/stator dispersing device (UTL 25 basic ULTRA-TURRAX with dispersing element: S 25 KV-25 G-IL). The emulsion was passed through the dispersing device with a rotation speed of 8000 rpm. The resulting fine emulsion had a temperature of 35° C., and was used for dipping ice cream bars. The dipping results are summarized in Table 3.

TABLE 2

| Phase | Ingredient | Example 1 % wt. | Example 1 Ratio % | Example 2 % wt. | Example 2 Ratio % |
|---|---|---|---|---|---|
| Fruit juice | | | 70 | | 70 |
| | Raspberry juice concentrate | 45 | | 55 | |
| | Sugar | 25 | | 30 | |
| | Water | 30 | | 15 | |
| Fat mix | | | 30 | | 30 |
| | Coconut oil | 97.3 | | 97.3 | |
| | PGPR | 1.4 | | 1.4 | |
| | Sugar ester | 1.3 | | 1.3 | |

TABLE 3

| Dip-temperature Samples | Drip-time (° C.) | Dry-time (s) | up-take* (s) | Weight (g) |
|---|---|---|---|---|
| Example 1 | | | | |
| 1 | 35.5 | 25 | 105 | 13.2 |
| 2 | 35 | 22 | 104 | 12.2 |
| 3 | 36 | 22 | 100 | 12.8 |
| 4 | 36 | 22 | 90 | 11.1 |
| Example 2 | | | | |
| 1 | 35 | 30 | 105 | 17.8 |
| 2 | 35 | 30 | 105 | 18.8 |
| 3 | 34.5 | 24 | 111 | 17.3 |

*The weight of uncoated ice cream bars was 43.5–44 g.

Example 3

A similar procedure to that described in Example 1 was followed except that passion fruit concentrate was used and fine emulsification was performed with a polytron (TEKMAR) with a rotation speed of 3000 rpm for 1 min. The temperature of the fine emulsion was 37° C. The ingredients of the composition are indicated in Table 4 and the dipping results are summarized in Table 5.

Example 4

A similar procedure to that described in Example 2 was followed except that passion fruit concentrate was used. The throughput of the emulsion passing the UTL 25 basic ULTRA-TURRAX dispersing device was 110 g/min. The emulsion had a very good consistency. The ingredients of the composition are indicated in Table 4 and the dipping results are summarized in Table 5.

The emulsion was then passed through the dispersing device for a second time with a rotation speed of 13,000 rpm. No significant change in viscosity was observed.

TABLE 4

| Phase | Ingredient | Example 1 % wt. | Example 1 Ratio % | Example 2 % wt. | Example 2 Ratio % |
|---|---|---|---|---|---|
| Fruit juice | | | 70 | | 70 |
| | Passion fruit juice Concentrate (50° Brix, 17% pulp) | 30 | | 30 | |
| | Sugar | 30 | | 30 | |
| | Water | 40 | | 40 | |

TABLE 4-continued

| Phase | Ingredient | Example 1 % wt. | Example 1 Ratio % | Example 2 % wt. | Example 2 Ratio % |
|---|---|---|---|---|---|
| Fat mix | | | 30 | | 30 |
| | Coconut oil | 97.3 | | 97.3 | |
| | PGPR | 1.4 | | 1.4 | |
| | Sugar ester | 1.3 | | 1.3 | |

TABLE 5

| temperature Samples | Dip-time (° C.) | Drip-Dry-time (s) | take* (s) | Weight up- (g) |
|---|---|---|---|---|
| Example 3 | | | | |
| 1 | 36.5 | 20 | 65 | 13.5 |
| 2 | 35 | 19 | 65 | 13.7 |
| 3 | 34.8 | 20 | 65 | 14 |
| 4 | 33 | 20 | 75 | 14.5 |
| 5 | 32.3 | 20 | 67 | 14.2 |
| Example 4 | | | | |
| 1 | 33.5 | 20 | 73 | 12.8 |
| 2 | 33.7 | 17 | 67 | 13.2 |
| 3 | 33.7 | 19 | 70 | 13.3 |
| 4 | 33.7 | 19 | 66 | 13 |
| 5 | 33.5 | 20 | 70 | 13.2 |

*The weight of uncoated ice cream bars was 43.5–44 g.

Example 5

A similar procedure to that described in Example 4 was followed except that the rotating speed of the in-line dispersing device was 9,500 rpm. The resulting emulsion was as good as that described in Example 4. The ice cream bars were well covered and the drip-time and the setting time were in the same range as obtained in Example 4. The weight pick-up was between 11.5 and 13 g.

Example 6

A fat phase was prepared by adding 0.3% of cofarom aroma oil (a mix of 97% coffee oil and 3% coffee distillate) to the fat mix described in Example 1.

An aqueous phase was prepared by adding 10% of sugar to fresh brewed coffee. 80 g of coffee ground was put in the filter and 1280 g of coffee brew was obtained. The solid content of the coffee brew was 2.8%.

700 g of the aqueous phase (39° C.) was progressively added (fine flow) to 300 g of the fat phase (38° C.), in a 1000 ml beaker, under agitation (460 rpm) with a U-shape stirring rod, thus forming a water-in-oil emulsion. The agitation was continued at a temperature of between 28 and 30° C. The dipping was performed directly at a temperature of between 29–30° C. and the setting time was comparable to that of the fruit emulsion.

After the emulsion was kept overnight at ambient temperature (no separation), it was warmed under agitation to 29° C. The ice cream bars were dipped in the emulsion and a product having very good coverage and the color of milk chocolate was obtained. The weight pick-up was about 12.5 g. On tasting, it gave a quick, strong coffee taste, which was not bitter and excellent.

At the moment when the ice cream bar was taken out from the emulsion, it had very smooth and shiny surface. Surprisingly, during setting there appeared many tiny spots in a homogeneous pattern, which gave a significantly enhanced coffee note.

Example 7

As in the example 1, an aqueous phase was prepared by mixing the raspberry fruit concentrate (65° Brix), water and sugar at ambient temperature until all the solids were dissolved. The resulting solution was pasteurized in a HTST system at 82° C. for 25 seconds. The pasteurized aqueous phase was collected and stored at 4–6° C. until use. The aqueous phase was then warmed up to 35–40° C. before use.

A fat phase was separately prepared by mixing coconut oil, high melting stearin (melted in a small amount of coconut oil) and emulsifiers at 36–40° C.

700 g of diluted raspberry fruit juice concentrate (35° C.) was progressively added (fine flow) to 300 g of the fat mix (38° C.), in a 1000 ml beaker, under agitation (300 rpm) with a U-shape stirring rod, thus forming a water-in-oil emulsion. The emulsion was then agitated at a temperature between 35 and 38° C. for 1 min. using the same agitator with a higher rotation speed (500 rpm). The resulting mass was then ready for dipping ice cream bars. The ingredients of the composition are indicated in Table 6.

Ice cream bars were dipped into the above emulsion. The drip-time was 15 seconds and the dry-time was about 100 s. The weight pick-up of the ice cream bar was 21.6 g (weight of the ice cream bar was 48 g). During the time of setting there appeared many evenly distributed tiny spots, which gave a significantly enhanced fruit note.

After drying, the products were stored at −20° C. The coated ice cream bars were very shiny with an attractive fruit color. The coating was also soft and there was no cracking when cut with a knife while frozen. The coating adhered well to the ice cream.

Example 8

Both aqueous and fat phases were prepared as described in Example 7. The ingredients of the composition are indicated in Table 6.

51 kg of the aqueous phase (38° C.) was pumped into 17 kg of the fat phase (40° C.) while mixing at a speed of 50 rpm. Once all the aqueous phase was added to the fat phase the mixing was continued for 10 min. to form a pre-emulsion. The pre-emulsion was pumped through a static mixer with a flow rate of 15 l/min. into a holding tank. The emulsion collected in the holding tank was kept at 35–40° C. with slow agitation and was ready to use as an ice cream coating.

TABLE 6

| Phase | Ingredient | Example 1 % wt. | Example 1 Ratio % | Example 2 % wt. | Example 2 Ratio % |
|---|---|---|---|---|---|
| Fruit juice | | | 70 | | 75 |
| | Raspberry juice concentrate | 15 | | 15 | |
| | Sugar | 50 | | 50 | |
| | Water | 35 | | 35 | |
| Fat mix | | | 30 | | 25 |
| | Coconut oil | 93 | | 93.7 | |
| | Monoglycerides | 6 | | 5 | |
| | Polysorbates | 0.5 | | 0.8 | |
| | Stearin | 0.5 | | 0.51 | |

Example 9

Ice cream domes were prepared using an ice cream mix with 58.5% water, 31.9% non-fat solids, 9.6% fat, and a 50–120% overrun. The domes were passed through a freezing tunnel and completely frozen at −22° C. The domes were then enrobed with the coating composition of Example 8 at 38° C. The domes obtained were adequately covered with a uniform layer of coating which properly adhered to the surface.

This method was also suitable for preparing bars and bite-size pieces.

Example 10

Cells of a stick machine in a brine tank at −38° C. were filled with the coating composition of Example 8 at 35° C. After 10 s, excess coating composition was removed and ice cream of 80% overrun was deposited at −2.5° C. into the thus formed shells. After insertion of sticks and backing off with more coating at 35° C., the ice sticks were demolded by heating at 12° C. and flow-wrapped.

Example 11

The coating of Example 8 was drop molded by depositing small beads on a steel band cooled at −20° C. to give small tear-shaped pieces which were further cooled in a tunnel and stored at −20° C. These pieces can be used as inclusions in ice cream.

Example 12

The method of Example 11 was carried out but the coating was deposited in small molds. After cooling, the small pieces were demolded.

What is claimed is:

1. A coating composition for coating frozen dessert products in the form of a water-in-oil emulsion comprising about 20% to 35% by weight fat phase; about 80% to 65% by weight water phase, wherein the water phase comprises about 10% to 70% by weight carbohydrates; and about 0.5% to 8% by weight of an emulsifier consisting essentially of a mixture of monoglycerides and polysorbates wherein the monoglycerides are dominant and the emulsifier mixture has a global hydrophilic balance of less than 5.

2. The coating composition of claim 1, further comprising other ingredients selected from the group consisting of sweeteners, flavorings, aroma agents, preservatives, colorants, and mixtures thereof.

3. The coating composition of claim 2 wherein the other ingredients are selected from the group consisting of non-fat cocoa solids, coffee, caramel, and fruit.

4. A coating composition of claim 2 prepared by a method comprising:

mixing water and the other ingredients at an acidic pH to prepare the aqueous phase;

mixing a fat with an emulsifier at a temperature where the fat is liquid to prepare the fat phase;

slowly introducing the aqueous phase into the fat phase while mixing to prepare a pre-emulsion; and further mixing the pre-emulsion under shear to form the emulsion, wherein the water phase represents about 80 to 65% by weight and the emulsifier represents about 0.5 to 8% by weight of the final composition.

5. The coating composition of claim 4, wherein the method further comprises the step of pasteurizing the water phase in a high temperature short time mix plant comprising a high shear mix tank, heating/cooling exchanger, holding tubes and optionally a homogenizer.

6. The coating composition of claim 1, wherein the water phase comprises a high water-containing food liquid or beverage.

7. A frozen confectionary product comprising a frozen dessert material and the coating composition of claim 1.

8. The frozen confectionary product of claim 7 wherein the coating composition forms a film, a layer, or an inclusion in the frozen dessert material.

9. The frozen confectionary product of claim 7, made by a method comprising dipping the frozen dessert material in the coating composition, wherein the water-in-oil emulsion is at a temperature of about 28 to 40° C.

10. The frozen confectionery product of claim 7 wherein the frozen desert material is present as a core and the coating composition is a film or layer that surrounds the core.

11. The frozen confectionery product of claim 10 wherein the film or layer includes inclusions.

12. A coating composition for coating frozen dessert products in the form of a water-in-oil emulsion comprising about 20% to 35% by weight fat phase; about 80% to 65% by weight water phase, wherein the water phase comprises about 10% to 70% by weight carbohydrates and a high water-containing food liquid or beverage; and about 0.5% to 8% by weight of an emulsifier comprising monoglycerides, polysorbates, and mixtures thereof; and wherein the high water-containing food liquid or beverage is selected from the group consisting of fruit juice with pulp, fruit juice without pulp, tea, coffee, honey, malt, caramel, maple syrup, and mixtures thereof.

13. A coating composition for coating frozen dessert products in the form of a water-in-oil emulsion comprising about 20% to 35% by weight fat phase; about 80% to 65% by weight water phase, wherein the water phase comprises about 10% to 70% by weight carbohydrates; and about 0.5% to 8% by weight of an emulsifier consisting essentially of a mixture of monoglycerides and polysorbates wherein the monoglycerides are dominant and the emulsifier or emulsifier mixture has a global hydrophilic balance of less than 5; and wherein the monoglycerides are present in an amount of about 5 to 6% by weight of the fat phase and the polysorbates are present in an amount of about 0.5 to 0.8% by weight of the fat phase.

* * * * *

UNITED STATES PATENT AND TRADEMARK OFFICE
CERTIFICATE OF CORRECTION

PATENT NO.    : 6,395,316 B1
DATED         : May 28, 2002
INVENTOR(S)   : Leas et al.

It is certified that error appears in the above-identified patent and that said Letters Patent is hereby corrected as shown below:

<u>Title page,</u>
Item [54], Title, change "CONFECTIONARY" to -- CONFECTIONERY --.
Item [30], Foreign Application Priority Data, change "980203136" to -- 98203136 --.

Signed and Sealed this

First Day of October, 2002

*Attest:*

*Attesting Officer*

JAMES E. ROGAN
*Director of the United States Patent and Trademark Office*